(12) United States Patent
Kuehnle

(10) Patent No.: US 8,349,911 B2
(45) Date of Patent: Jan. 8, 2013

(54) SILANE-BASED, AQUEOUS COATING SYSTEM, PRODUCTION AND USE THEREOF

(75) Inventor: Adolf Kuehnle, Marl (DE)

(73) Assignee: Evonik Degussa GmbH, Essen (DE)

( * ) Notice: Subject to any disclaimer, the term of this patent is extended or adjusted under 35 U.S.C. 154(b) by 202 days.

(21) Appl. No.: 12/673,777

(22) PCT Filed: Jul. 2, 2008

(86) PCT No.: PCT/EP2008/058492
§ 371 (c)(1),
(2), (4) Date: Feb. 17, 2010

(87) PCT Pub. No.: WO2009/024386
PCT Pub. Date: Feb. 26, 2009

(65) Prior Publication Data
US 2011/0039972 A1   Feb. 17, 2011

(30) Foreign Application Priority Data

Aug. 17, 2007  (DE) .......................... 10 2007 039 061
Dec. 14, 2007  (DE) .......................... 10 2007 060 334

(51) Int. Cl.
*C08F 2/50* (2006.01)
*C08J 3/28* (2006.01)
*B32B 27/16* (2006.01)
*B32B 27/28* (2006.01)
*B32B 27/30* (2006.01)

(52) U.S. Cl. ............ 522/172; 522/84; 522/99; 522/148; 522/150; 522/151; 522/152; 522/173; 522/178; 524/837; 524/588; 524/611; 524/841; 524/843; 524/475; 525/505; 525/475; 525/502; 427/508; 427/515; 427/517

(58) Field of Classification Search .................... 522/84, 522/99, 148, 172, 150, 151, 152, 173, 178; 524/837, 588, 611, 841, 843, 475; 525/505, 525/475, 502; 427/508, 515, 517

See application file for complete search history.

(56) References Cited

U.S. PATENT DOCUMENTS

| | | | |
|---|---|---|---|
| 3,477,901 A | 11/1969 | Keil et al. |
| 3,890,269 A | 6/1975 | Martin |
| 4,690,959 A | 9/1987 | Plueddemann |
| 5,178,675 A | 1/1993 | Sexsmith |
| 5,215,822 A | 6/1993 | Wyman et al. |
| 5,629,400 A | 5/1997 | Standke et al. |
| 5,679,147 A | 10/1997 | Standke et al. |
| 5,717,125 A | 2/1998 | Wolter et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,907,015 A | 5/1999 | Sexsmith |
| 5,932,757 A | 8/1999 | Standke et al. |
| 6,054,601 A | 4/2000 | Standke et al. |
| 6,133,466 A | 10/2000 | Edelmann et al. |
| 6,177,582 B1 | 1/2001 | Jenkner et al. |
| 6,228,936 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |
| 6,491,838 B1 | 12/2002 | Standke et al. |
| 6,534,667 B1 | 3/2003 | Standke et al. |
| 6,641,870 B2 | 11/2003 | Bartkowiak et al. |
| 6,713,186 B1 | 3/2004 | Jenkner et al. |
| 7,578,877 B2 | 8/2009 | Giessler et al. |
| 7,666,257 B2 | 2/2010 | Giessler-Blank et al. |
| 7,670,422 B2 | 3/2010 | Giessler-Blank et al. |
| 2009/0005518 A1 | 1/2009 | Just et al. |
| 2009/0030162 A1 | 1/2009 | Mueh et al. |

FOREIGN PATENT DOCUMENTS

| | | |
|---|---|---|
| DE | 44 16 857 | 6/1995 |
| EP | 0 244 814 | 11/1987 |
| EP | 0 502 274 | 9/1992 |
| EP | 0 505 115 | 9/1992 |
| EP | 0 675 128 | 10/1995 |
| EP | 0 832 911 | 4/1998 |
| WO | 96 04339 | 2/1996 |
| WO | 01 66656 | 9/2001 |

OTHER PUBLICATIONS

U.S. Appl. No. 12/673,390, filed Feb. 16, 2010, Wassmer, et al.

Primary Examiner — Sanza McClendon
(74) Attorney, Agent, or Firm — Oblon, Spivak, McClelland, Maier & Neustadt, L.L.P.

(57) ABSTRACT

Production of a composition based on silanes for the scratch-resistant, hydrophobic, aqueous coating of metals, plastics, chemical products, ceramic materials, concrete and glass.

26 Claims, No Drawings

SILANE-BASED, AQUEOUS COATING SYSTEM, PRODUCTION AND USE THEREOF

The invention relates to a water-dispersed coating material based on silanes with amino groups and on an organic acid containing double bonds. The invention further relates to a process for its preparation and to its use.

In accordance with the prior art, aqueous coating systems—besides solutions—are subdivided generally into dispersions and emulsions, the expression dispersion characterizing the aggregate state of a finely divided solid in a liquid, whereas an emulsion is understood to be a finely and homogeneously distributed liquid phase in a second liquid. Polymer dispersions, as they are referred to, are polymers finely dispersed in water, and, depending on glass transition temperature and/or chain length, constitute viscous liquids or solids. In order to be able to disperse these polymers in water, or to make them compatible with water, emulsifiers are used. These are oligomeric or polymeric compounds which have a hydrophilic and a lipophilic residue. While the lipophilic end is generally always a long branched or unbranched alkyl chain, the emulsifier systems are referred to as nonionic, anionic or cationic in accordance with whether the hydrophilic end comprises a polyalkyl ether, a carboxylate function or an ammonium salt. In principle an emulsifier is firmly anchored in the polymer via its lipophilic radical, and so the polymer acquires hydrophilic groups and can be dispersed in water. These emulsifier systems can be modified so that the polymer itself already carries carboxylate or ammonium functions which, for dispersion in water, can be reacted with alkali metal or alkaline earth metal hydroxides or with amines, or else with acids such as formic acid or acetic acid. Depending on their structure, these emulsifier systems have a variety of drawbacks. In the case of nonionic emulsifiers, the quantities required are usually relatively large, and so the coating becomes moisture-sensitive. Furthermore, nonionic emulsifiers diffuse to the surface, which consequently becomes greasy, impairing the intercoat adhesion. Where alkali metal or alkaline earth metal hydroxides are used, anionic emulsifiers also produce moisture-sensitive coatings. When amines are used in anionic systems, their volatilization does achieve a relatively high water resistance, but amines are emitted to the environment. The situation is similar with cationic systems, which on drying typically give off a volatile acid such as acetic or formic acid, for example.

Further remarks on this subject are found in "Wässrige Polymerdispersionen—Synthese, Eigenschaften, Anwendungen" (Dieter Distler, Wiley-VCH Weinheim, 1999).

The products offered on the market are very diverse and include, for example, dispersions based on acrylates, styrene-acrylates, butadiene-styrene, vinylidene-styrene, polyurethane, vinyl acetates, vinyl acrylates, butadiene-acrylonitrile, and ethene-vinyl acetates. Which dispersion is used for which application is generally a question of the desired pattern of properties and of the costs. Fields of application are found in the paper industry and the graphics industry, the paints and coatings industry, the adhesive industry, the textile industry and carpet industry, the leather industry, the construction industry, the industry for production of molded foam, and also in medicine and pharmacy.

Furthermore, under the commercial designations DYNASYLAN® HS and Hydrosil, Degussa GmbH offers products, such as 2909, 2775, 2627, 2776 and 2907, in the form of aqueous silane systems, which by virtue of the silanol groups present attach very effectively to surfaces containing hydroxyl groups, where they adhere. The resultant films are highly transparent, but unfortunately are soft and not scratch-resistant, and so coatings based on these products are eliminated from surfaces of finished products. Consequently these types can be recommended only as additives, as primers, as adhesion promoters, for the sizing of glass fiber or for the surface treatment of minerals. A further factor is that, for reasons of stability or occupational hygiene, they can only be offered either as acidic solutions with a pH of around 4 or as a basic system with a pH of around 11. As mentioned above, the acidic solutions contain volatile acids, formic acid for example, which on drying is volatilized and is given off as a hazardous substance. Alkaline or basic systems, in turn, undergo hydrolysis and condensation more rapidly than acidic systems, and so this partial condensation produces oligomers. Following the application, because of crosslinking groups that have already been consumed, they are no longer able to crosslink to the required extent, and films are produced that are relatively soft. (EP 0 716 127, EP 0 716 128, EP 0 832 911, EP 1 101 787, WO 06/010666, WO 05/014741)

The object was to develop a silane-based polymer dispersion which does undergo hydrolysis but has a low basicity which prevents the formation of oligomers. When the polymer dispersions are dried there ought in turn to be no volatile acids emitted to the environment.

The object is achieved in accordance with the invention as specified in the claims.

Hence it has been possible, surprisingly, to achieve this object by dispersing an aminoalkoxysilane whose amino groups have been reacted with an organic acid containing double bonds, generally producing a corresponding ammonium salt, in water. By setting of a suitable pH it is possible on the one hand for hydrolysis to take place, but on the other hand the condensation to form oligomers is very largely prevented.

When a present composition is applied to a substrate it is possible, before or after the drying operation and/or film formation, for the organic acid containing double bonds to be crosslinked without problems, and it may therefore remain as a polymer in the silane film that is formed. Surprisingly, this also makes the silane film hard and scratch-resistant.

As a result of the fact that silanes are the most stable in the neutral range, and undergo little hydrolysis, whereas at alkaline pH (>8) are increasingly more readily hydrolyzed and form oligomers and polymers through condensation, and, further, at an acidic pH (<4) they likewise undergo hydrolysis and additionally, on drying, give off volatile acid, the process of the invention offers the advantage that the pH of the reaction solution can be tailored to a range from 4 to 7, with no acids at all being given off.

The process of the invention is carried out using one or more aminosilanes or aminoalkylsilanes of the general formula I $$A_m SiY_n \qquad (I),$$

in which

A is a substituted or unsubstituted aminoalkyl group, a substituted or unsubstituted diaminodialkyl group or a substituted or unsubstituted triaminotrialkyl group.

Aminosilanes or aminoalkylsilanes of this kind are, for example—but not exclusively—3-aminopropyltrimethoxysilane, 3-aminopropyltriethoxysilane, 2-aminoethyl-3-aminopropyltrimethoxysilane, triaminofunctional propyltrimethoxysilane, bis(3-trimethoxysilylpropyl)amine, bis(3-triethoxysilylpropyl)amine, N-benzyl-N-(2-aminoethyl)-3-aminopropyltrimethoxysilane hydrochloride, N-benzyl-N-(2-aminoethyl)-3-aminopropyltrimethoxysilane hydroacetate, N-(n-butyl)-3- aminopropyltrimethoxysilane, 3-aminopropylmethyldiethoxysilane, N-vinylbenzyl-N-(2-aminoethyl)-3-aminopropylpolysiloxane, and N-(2-aminoethyl)-3-aminopropylmethyldimethoxysilane.

Preferred aminosilanes or aminoalkylsilanes are substituted or unsubstituted aminosilane compounds, more particularly 3-aminopropyltrimethoxysilane, 3-aminopropyltriethoxysilane, 3-aminopropylmethyldiethoxysilane, N-(2-aminoethyl)-3-aminopropyltrimethoxysilane, 2-aminopropyl-3-aminopropyl-trimethoxysilane, 2-aminopropyl-3-aminopropyltriethoxysilane, 2-aminoethyl-2-aminoethyl-3-aminopropyltrimethoxysilane, 2-aminoethyl-2-aminoethyl-3-aminopropyltriethoxysilane, and N-(n-butyl)-3-aminopropyltrimethoxysilane. Particular preference is given to DYNASYLAN® AMMO, DYNASYLAN® AMEO, DYNASYLAN® 1505, DYNASYLAN® 1189, DYNASYLAN® DAMO, and DYNASYLAN® TRIAMO.

The groups Y are alike or different, and Y is OH, ONa, OK, OR', OCOR', OSiR'$_3$, Cl, Br, I or NR'$_2$, m is 1 or 2 and n is 1, 2 or 3, with the proviso that m+n=4, the group R' independently being hydrogen, linear or branched alkyl, cycloalkyl, alkenyl, cycloalkenyl, alkynyl, cycloalkynyl, aryl or heteroaryl groups, each having 1 to 18 C atoms and each being able optionally to be substituted.

Optionally it is possible to add one or more silanes of the general formula (II)

$$(R)_a(X)_bSiY_n \qquad (II)$$

in which the groups R independently are hydrogen, alkyl, cycloalkyl, alkenyl, cycloalkenyl, alkynyl, cycloalkynyl, aryl or heteroaryl groups and each have 1 to 18 C atoms, and may optionally be substituted, the groups X are alike or different and X is an oxy, hydroxyl, alkoxy, carboxyl, silyl, alkylsilyl, alkoxysilyl, siloxy, alkylsiloxy, alkoxysiloxy, silylalkyl, alkoxysilylalkyl, alkylsilylalkyl, halo, omega-haloalkyl, epoxy, omega-glycidyloxyalkyl, ester, fluoroalkyl or perfluoroalkyl, blocked isocyanate, cyanatoalkyl, isocyanatoalkyl, omega-methacryloyloxyalkyl, acrylate, methacrylate, mercapto, omega-mercaptoalkyl, nitrile or phosphine group, the groups Y are alike or different and Y is OH, ONa, OK, OR', OCOR', OSiR'$_3$, Cl, Br, I or NR'$_2$, the groups R' independently being hydrogen, linear or branched alkyl, cycloalkyl, alkenyl, cycloalkenyl, alkynyl, cycloalkynyl, aryl or heteroaryl groups and each having 1 to 18 C atoms, and also being able optionally to be substituted, and a is 0 or 1 and b is 0 or 1, and n is 1, 2 or 3, with the proviso that a+b+n=4.

Preference is given here to using trialkoxysilanes, more particularly alkyltrialkoxysilanes of the type RSi(OR')$_3$, where the alkoxy group (OR') has from 1 to 4 carbon atoms, more particularly a methoxy or ethoxy group, and the alkyl group (R) has from 1 to 5 carbon atoms, more particularly from 2 to 4 carbon atoms, but preferably 3 carbon atoms. Examples of alkyltrialkoxysilanes of the formula RSi(OR')$_3$ are isobutyltrimethoxysilane (DYNASYLAN® IBTMO), isobutyltriethoxysilane, propyltrimethoxysilane (DYNASYLAN® PTMO), propyltriethoxysilane, ethyltrimethoxysilane, ethyltriethoxysilane, methyltrimethoxysilane (DYNASYLAN® MTMS) or methyltriethoxysilane. In the process of the invention it is also possible to use trialkoxysilanes having a substituent of the type X, of the formula XSi(OR')$_3$, such as, for example, 3-chloropropyltrimethoxysilane, 3-glycidyloxypropyltrimethoxysilane (DYNASYLAN® GLYMO), 3-mercaptopropyltrimethoxysilane (DYNASYLAN® MTMO), and 3-methacryloyloxypropyltrimethoxysilane (DYNASYLAN® MEMO). One particular embodiment uses alkenyltrialkoxysilanes, such as vinyltrimethoxysilane (DYNASYLAN® VTMO) or vinyltriethoxysilane, for example.

In order to achieve particular properties it is possible additionally to use silanes modified with fluorine groups as well. For the preparation of systems for imparting water repellency use is made for this purpose preferably of fluoroalkyltrialkoxysilanes, preferably fluoroalkyltrialkoxysilanes of the formula CF$_3$((CF$_2$)$_o$(CH$_2$)$_p$)Si(OR')$_3$ with o, p=0-12, such as, for example, 3,3,4,4,5,5,6,6,7,7,8,8,8-tridecafluorotriethoxysilane (DYNASYLAN® F 8261).

Another embodiment uses, in particular, halosilanes, preferably trichlorosilanes, together with alkoxysilanes in the process of the invention. The hydrochloric acid formed in the course of the hydrolysis must be removed.

In the first process substep of the process of the invention, the aminosilane and/or aminoalkylsilane of formula I that is used is advantageously neutralized completely or partly with an acid containing carbon double bonds. These acids may be monoprotic or polyprotic acids. In the process of the invention it is preferred, however, to use acrylic acid, methacrylic acid, maleic acid, fumaric acid, aconitic acid, oleic acid, and the derivatives of the aforementioned acids. The amount-of-substance ratio of the aminosilanes and/or aminoalkylsilanes to the acid is preferably to be selected such that for each primary, secondary or tertiary amino group there are from 0.2 to 2.0 amount-of-substance equivalents of a monoprotic acid available. Added are 0.8 to 1.2 amount-of-substance equivalents, preferably 0.95 to 1.05 amount-of-substance equivalents, of a monoprotic acid. Where organic acids having two or more acid functions are used, such as maleic acid or fumaric acid, for example, a corresponding amount-of-substance ratio should be chosen.

Preparation may take place, for example, by dropwise addition of the appropriate amount of acid to the silane mixture with cooling, this variant being especially suitable when equivalent amounts of acid and amine are employed. This may take place either in a solvent or without use of a solvent. Where a solvent is used, advantage is possessed by alcohols, such as ethanol or methanol, for example. The concentrations of the solutions are 0.1% to 99.9% by weight, preferably 20% to 90% by weight, more particularly 30% to 80% by weight. In principle, however, the reaction can be carried out in any other organic solvent, subject to the proviso that the reaction components dissolve therein. A mixture of this kind can be stored for a relatively long time, if needed, as an intermediate.

In a second process substep, the adduct formed from the silanes A$_m$SiY$_n$ of formula I and (R)$_a$(X)$_b$SiY$_n$ of formula II and the acid used in accordance with the invention, either in 100% concentration or in solution in an organic solvent, is incorporated by stirring into water at temperatures above 20° C. and below 80° C., preferably at temperatures between 30° C. and 70° C., more particularly at temperatures between 35° C. and 45° C., the ratio of inventively used silanes to acid being chosen such that the reaction solution, after stirred incorporation has taken place, has a pH of 2 to 9, preferably a pH of 3 to 8, more preferably a pH of 4 to 7.5. The alcohols formed in the course of the hydrolysis, such as methanol or ethanol, and the solvent used as well, if appropriate, are subsequently distilled off at temperatures above 20° C. and below 80° C., preferably at temperatures between 30° C. and 70° C., more particularly at temperatures between 35° C. and 45° C., the pressure being lowered in the latter cases with a vacuum pump. If in the course of this distillation of the alcohol and of the solvent used as well, if appropriate, water is entrained out as well, the amount of water may be replenished subsequently.

Following dilution with water, the aqueous solutions then have an acid-neutralized silane content of ≦50% by weight, preferably of 5% to 40% by weight, more particularly of 10% to 30% by weight.

In one particular embodiment the present process may be practiced such as to result in a reaction solution pH of approximately 3 to 4.5. In this case some of the silanol groups formed in the hydrolysis are retained, since at this pH the further condensation is hindered. This means that a condensation or crosslinking occurs in particular in the case of a change in pH, for example after application, if the system is applied to a basic surface such as concrete or metals. The condensation or crosslinking also occurs, however, when the water has been volatilized.

In a further embodiment of this two-stage operation, the second process step is carried out advantageously on site and immediately prior to the application itself. This means that, in this second process step, the adduct formed from the silanes $A_mSiY_n$ of formula I and $(R)_a(X)_bSiY_n$ of formula II and the inventively used acid, either in 100% concentration or in solution, is incorporated into water by stirring on site at a temperature above 0° C., preferably at a temperature above 10° C., more particularly at a temperature between 20° C. and 40° C. In this case there is the advantage, for example, of a saving on transport costs.

A particularly preferred process is based on a single-stage operation. In this case the organic acid in water is introduced and the silane or silane mixture is stirred into it over the course of 0.1 to 10 hours. Advantageously then the amount of acid required to retain some of the silanol groups or to result, following addition of the silane or silane mixture, in a pH of 3 to 8, preferably of 7 to 7.5, is introduced. In order to prevent an excessive drop in pH into the acidic range, the addition of the acid—distributed over the reaction time as a whole—may take place in up to 100 individual portions. This process on the one hand offers the advantage of a particularly simple process arrangement, while on the other hand alcohols formed as a result of hydrolysis, such as methanol or ethanol, can be distilled off even during the addition of the silane mixture, at temperatures above 20° C. and below 80° C., preferably at temperatures between 30° C. and 70° C., more particularly at temperatures between 35° C. and 45° C.; in the latter cases, the pressure should be lowered using a vacuum pump. During the azeotropic distillation of the alcohol, the amount of water entrained along with it should be replenished.

At the end the aqueous solutions then have an acid-neutralized silane content of ≦50% by weight, preferably of 5%-40% by weight, more particularly of 10%-30% by weight.

The reaction of the silanes and modified aminosilanes and/or aminoalkylsilanes in accordance with this single-stage process in water is carried out preferably at a temperature of 0 to 200° C., more preferably at a temperature of 10 to 100° C., with particular preference at a temperature of 20 to 90° C. With very particular preference this reaction of the silanes is carried out at a temperature of 60±15° C. In one particular embodiment of the process of the invention the temperature is not kept constant over the entire reaction time. Thus, for example, it is advantageous to raise the reaction temperature somewhat toward the end of the reaction time, in order, as mentioned, to distill off the solvents, where present, and the alcohols formed in the hydrolysis, such as methanol, ethanol or a mixture of these alcohols.

The process of the invention for reacting aminosilanes and silanes leads advantageously to silanols and siloxanes and/or to siloxanes with ammonium groups which comprise as their counterion an acrylate, methacrylate, maleate, fumarate, oleate, itaconic or aconitic acid anion or a derivative of the aforementioned acids.

In total, aqueous solutions are prepared in concentrations of below 50% by weight, preferably of 5% to 40% by weight, more particularly of 10% to 30% by weight.

The process of the invention can be carried out continuously or in batch operation.

In order to crosslink the acid containing double bonds after the dispersion has been applied (by spreading, dipping, spraying or knifecoating, for example), it is possible to employ electron-beam crosslinking (e.g., at a temperature of 100° C.; radiation dose of 3 Mrad; electron beam unit: Electrocurtain, Energy Sciences Int.) or it is possible to employ regulators and initiators.

Regulators are added to the dispersion to adjust the molecular weights, the amount used, relative to the amount of acid, being preferably from 0.05% to 5% by weight, more preferably from 0.1% to 2% by weight, and with particular preference from 0.2% to 1% by weight. More particularly the coating composition of the invention comprises a chain transfer agent selected from mercaptans, such as n-butyl mercaptan, n-dodecyl mercaptan, 2-mercaptoethanol, or 2-ethylhexyl thioglycolate, for example. Preferably the coating composition of the invention comprises n-dodecyl mercaptan.

For free-radical polymerization or crosslinking of the coating composition of the invention the composition may comprise what are referred to as polymerization initiators. More particularly the coating composition of the invention contains from 0.01% to 2% by weight, relative to the amount of acid. As polymerization initiators the dispersion of the invention preferably comprises azo compounds, such as 2,2'-azobis (isobutyronitrile), 2,2'-azobis(isobutyramidine)dihydrochloride or 2,2'-azobis(2,4-dimethylvaleronitrile), for example, or redox systems, such as the combination of tertiary amines with peroxides, for example. The dispersion of the invention preferably comprises peroxides, more preferably peroxodisulfate, dilauroyl peroxide, tert-butyl peroctoate, tert-butyl perisononanoate, dicyclohexyl peroxydicarbonate, dibenzoyl peroxide or 2,2-bis(tert-butylperoxy)butane. The dispersion of the invention may also comprise a mixture of different polymerization initiators having different half-lives, such as, for example, dilauroyl peroxide and 2,2-bis(tert-butylperoxy)butane, in order to maintain a constant flow of free radicals in the course of the polymerization and also at different polymerization temperatures. In one particular embodiment the dispersion of the invention may comprise photoinitiators, such as DAROCUR® or IRGACURE® types, for example, which more particularly are α-hydroxyl ketones, phenyl glyoxylates, benzyl dimethyl ketals or α-amino ketones.

If they are soluble in water or are dispersed in water with the system of the invention as dispersing assistant and/or with additional, commercial dispersing assistants, it is possible to admix a broad spectrum of acrylate compounds and methacrylate compounds to the system of the invention, such as, for example, methyl(meth)acrylate, ethyl(meth)acrylate, propyl(meth)acrylate, isopropyl(meth)acrylate, butyl(meth) acrylate, isobutyl(meth)acrylate, tert-butyl(meth)acrylate, hexyl(meth)acrylate, heptyl(meth)acrylate, 2-ethylhexyl (meth)acrylate, cyclohexyl(meth)acrylate, octyl(meth)acrylate, isooctyl(meth)acrylate, decyl(meth)acrylate, benzyl (meth)acrylate, tetrahydrofurfuryl(meth)acrylate, octadecyl (meth)acrylate, dodecyl(meth)acrylate, tetradecyl(meth) acrylate, oleyl(meth)acrylate, 4-methylphenyl(meth) acrylate, benzyl(meth)acrylate, furfuryl(meth)acrylate, cetyl (meth)acrylate, 2-phenylethyl(meth)acrylate, isobornyl (meth)acrylate, and neopentyl(meth)acrylate.

If desired it is possible, in order to adjust the molecular weights, to add what are referred to as chain transfer agents, from the class, for example, of the mercaptans known for this purpose, such as n-butyl mercaptan, n-dodecyl mercaptan, 2-mercaptoethanol or 2-ethylhexyl thioglycolate, the chain transfer agents being used in general in amounts of 0.05% to 5% by weight, based on the monomer mixture, preferably in amounts of 0.1% to 2% by weight, and more preferably in amounts of 0.2% to 1% by weight on the monomer mixture. As chain transfer agent it is preferred to use n-dodecyl mercaptan.

The mixing ratio of the silane-based system of the invention to optionally added acrylate or methacrylate compounds is 0.1:99.1% by weight to 99.9:0.1% by weight. Preferably it is 30:70% by weight to 70:30% by weight. More particularly a maximum of 15% by weight of the acrylate or methacrylate compounds are added to the aqueous system.

It will be appreciated that further additives as well, such as heat stabilizers and light stabilizers, especially UV absorbers, optical brighteners, antistats, lubricants, antiblocking agents, nucleating agents, fillers, dyes, pigments, and flame retardants, for example, may be present in the system of the invention. Relative to the solids content of the dispersion, said system comprises additives at in total preferably from 0.01% to 5.0% by weight. The use of wetting agents and flow control agents in amounts of 0.01% to 5.0% by weight as well may be advisable in the case of certain surfaces.

The composition of the invention can be put to diverse uses such as, for example, for metal surfaces, the coating of fillers, for the water repellency coating of salts, especially the coating of perborates, for the coating of tacky plastics pellets, for the coating of concrete and glass, for the synthesis of catalysts and their starting compounds, for stabilizers, and also for the synthesis and/or modification of ceramic masses and polymers, and also for the coating of polymer pellets, polymer sheets, polymer fibers, and semifinished polymer products.

The examples which follow are intended to illustrate the coating composition of the invention, its preparation and use, and also the inventively coated shaped articles, without restricting the invention.

EXAMPLE 1

Synthesis of a Composition with $(aminopropyl)_x$ $Si_xO_{1.5x}$ Fractions and Methacrylic Acid 100 ml of ethanol are admixed with stirring at room temperature with 176.8 g (0.8 mol) of 3-aminopropyltriethoxysilane (DYNASYLAN® AMEO). These compounds are quickly admixed with 68.87 g (0.8 mol) of methacrylic acid. Subsequently 400 g of water are added at room temperature. The temperature is then raised to 60° C. and the system is stirred at this temperature for 6 hours. After the ethanol has been distilled off under reduced pressure and the azeotropically entrained amount of water which has been distilled off has been replaced, a pale yellowish solution is the end product obtained.

EXAMPLE 2

Synthesis of a Composition with $(aminopropyl)_{x-5.6}$ $(methyl)_{x-2.4}Si_xO_{1.5x}$ Fractions and Methacrylic Acid 100 ml of ethanol are admixed with stirring at room temperature with 53.04 g (0.24 mol) of 3-aminopropyltriethoxysilane (DYNASYLAN® AMEO). These compounds are quickly admixed with 20.66 g (0.24 mol) of methacrylic acid. Subsequently 76.25 g (0.56 mol) of methyltrimethoxysilane (DYNASYLAN® MTMS) and subsequently 300 g of water are added at room temperature. The temperature is then raised to 50° C. and the system is stirred at this temperature for 6 hours. After the ethanol and methanol have been distilled off under reduced pressure and the azeotropically entrained amount of water which has been distilled off has been replaced, a pale yellowish solution is the end product obtained.

EXAMPLE 3

Synthesis of a Composition with $(aminopropyl)_{x-5}$ $(methyl)_{x-3}Si_xO_{1.5x}$ Fractions and Acrylic Acid 300 ml of water, into which beforehand, at room temperature, 21.62 g (0.30003 mol) of acrylic acid have been incorporated by stirring, are subsequently admixed with further stirring at room temperature, over the course of 10 minutes, with 66.3 g (0.30 mol) of 3-aminopropyltriethoxysilane (DYNASYLAN® AMEO). Subsequently at room temperature 68.08 g (0.50 mol) of methyltrimethoxysilane (DYNASYLAN® MTMS) are added and the temperature is raised to 50° C. Thereafter the system is stirred at this temperature for 6 hours. Following the distillative removal of the ethanol and methanol under vacuum and the replacement of the azeotropically entrained amount of water which has been distilled off, a pale yellowish solution is obtained as the end product.

EXAMPLE 4

Preparation of an Activated Solution from Example 2

At room temperature 1.0 g of peroxodisulfate is incorporated, by stirring with a laboratory dissolver, into 100 ml of product from Example 2, and stirring is continued for 30 minutes. After that the activated solution is complete.

EXAMPLE 5

Preparation of an Activated Dispersion of the Product from Examples 1 and 2

50 ml of product from Example 1 and 50 ml of product from Example 2 are stirred with a laboratory dissolver and heated to 40° C. Thereafter 0.5 g of 2,2'-azobis-(isobutyramidine)dihydrochloride is added and stirring is continued at this temperature for 30 minutes. After cooling to room temperature the activated dispersion is complete.

EXAMPLE 6

Sheet Steel Shaped Articles to be Coated

Sheet metal test specimens (Chemetall No. 129611 with Bonder rust preventative 26/NL 60).

These test specimens—the uncoated test specimen representing the control sample—are coated at room temperature with the solution/dispersion from Example 4 (test specimen 6.1) or from Example 5 (test specimen 6.2) in a coat thickness of 200 μm, using a laboratory doctor blade. Following this application, the film is dried at room temperature. This is followed by storage at 50° C. for 24 hours in a vacuum drying cabinet. After that, heat treatment takes place for 1 hour in the drying cabinet at 100° C., followed by cooling to room temperature over the course of 24 hours.

EXAMPLE 7

Transparent Polyamide Shaped Articles to be Coated

Transparent polyamide test specimens manufactured in-house (Trogamid® CX 7323, Degussa GmbH).
Format (length/width/depth): 15 cm×10 cm×0.5 cm.
Coating and treatment take place with the same solution/dispersion as in Example 6. However, only half of the area is coated, with the uncoated area serving as the control sample. The two test specimens carry the designation 7.1 and 7.2.

EXAMPLE 8

Tests

The specimens from Example 6 are stored under outdoor weathering conditions (central European climate) in vertical position for 6 months (period March to August) and thereafter are assessed visually, with a rating of 1 being a very good evaluation and a rating of 5 being a very poor evaluation.

| Serial number | Substrate (as per Example 6) | Inventive | Appearance of surfaces after outdoor weathering |
|---|---|---|---|
| 1 | Control sample | No | 5 |
| 2 | Metal sheet (6.1) | Yes | 1 |
| 3 | Metal sheet (6.2) | Yes | 1 |

The coated specimens 2 and 3 have a water-resistant, transparent and hard film which undergoes no change on outdoor weathering. The drying of the solution/dispersion as well takes place without any emission of solvent, amine or acid.

The scratch resistance of the samples from Example 7 is investigated by first removing the test specimens from the drying cabinet and cooling them over the course of 24 hours, and then moving commercial steel wool (amount about 1 cm$^3$) by hand under a gentle load (about 100 pond) 10 times each forward and backward over the entire substrate. This means that abrading is carried out with the same intensity over both the coated area and the uncoated area. This is followed by a visual assessment of which of the two polyamide surfaces (i.e., uncoated-coated) has more scratch tracks, with a rating of 1 being a very good evaluation and a rating of 5 a very poor evaluation.

| Serial number | Substrate (as per Example 6) | Inventive | Appearance of surfaces after scratch resistance test |
|---|---|---|---|
| 4 | Control sample | No | 3 |
| 5 | Trogamid CX 7323 (7.1) | Yes | 1 |
| 6 | Trogamid CX 7323 (7.2) | Yes | 1 |

The coated specimens 5 and 6 are significantly more scratch-resistant than the control sample.

The invention claimed is:

1. A process for preparing a composition comprising functionalized silanes or functionalized siloxanes, or mixtures thereof; wherein said process comprises:
reacting one or more aminosilanes with at least one acid comprising carbon double bonds, and water in a presence of a photoinitiator in an amount of 0.01% to 2% by weight,
wherein the one or more aminosilanes are represented by formula I $$A_mSiY_n \qquad (I),$$

in which A is a substituted or unsubstituted aminoalkyl group, a substituted or unsubstituted diaminodialkyl group or a substituted or unsubstituted triaminotrialkyl group,
the groups Y are alike or different and Y is OH, ONa, OK, OR', OCOR', OSiR'$_3$, Cl, Br, I or NR'$_2$,
m is 1 or 2 and n is 1, 2 or 3, with the proviso that m+n=4,
the group R' independently being hydrogen, linear or branched alkyl, cycloalkyl, alkenyl, cycloalkenyl, alkynyl, cycloalkynyl, aryl or heteroaryl groups, each having 1 to 18 C atoms and each being optionally substituted.

2. The process of claim 1, further comprising:
reacting one or more silanes with the at least one acid and water, together with the one or more aminosilanes represented by the formula I, wherein the one or more silanes are represented by formula II $$(R)_a(X)_bSiY_n \qquad (II)$$

in which the groups R independently are hydrogen, alkyl, cycloalkyl, alkenyl, cycloalkenyl, alkynyl, cycloalkynyl, aryl or heteroaryl groups and each have 1 to 18 C atoms, and may optionally be substituted,
the groups X are alike or different and X is an oxy, hydroxyl, alkoxy, carboxyl, silyl, alkylsilyl, alkoxysilyl, siloxy, alkylsiloxy, alkoxysiloxy, silylalkyl, alkoxysilylalkyl, alkylsilylalkyl, halo, omega-haloalkyl, epoxy, omega-glycidyloxyalkyl, ester, fluoroalkyl or perfluoroalkyl, blocked isocyanate, cyanatoalkyl, isocyanatoalkyl, omega-methacryloyloxyalkyl, acrylate, methacrylate, mercapto, omega-mercaptoalkyl, nitrile or phosphine group,
the groups Y are alike or different and Y is OH, ONa, OK, OR', OCOR', OSiR'$_3$, Cl, Br, I or NR'$_2$,
a is 0 or 1 and b is 0 or 1, and n is 1, 2 or 3, with the proviso that a+b+n=4, and
the groups R' independently are hydrogen, linear or branched alkyl, cycloalkyl, alkenyl, cycloalkenyl, alkynyl, cycloalkynyl, aryl or heteroaryl groups, each having 1 to 18 C atoms and being optionally substituted.

3. The process of claim 1,
wherein the one or more aminosilanes of the formula I are modified by addition of 0.2 to 2.0 amount-of-substance equivalents of the at least one acid.

4. The process of claim 1,
wherein the one or more aminosilanes of the formula I are modified with 0.5 to 1.5 amount-of-substance equivalents of the at least one acid.

5. The process of claim 1,
wherein the one or more aminosilanes of the formula I are modified with 0.8 to 1.2 amount-of-substance equivalents of the at least one acid.

6. The process of claim 1,
wherein the at least one acid has 3 to 20 carbon atoms and comprises at least one double bond.

7. The process of claim 1,
wherein the at least one acid comprises an organic acid, a derivative of the organic acid, or a mixture of the organic acid, and the organic acid is selected from the group consisting of acrylic acid, methacrylic acid, maleic acid, fumaric acid, aconitic acid, oleic acid, and itaconic acid. 8. The process of claim 1,
wherein, after the reacting of the one or more aminosilanes of the formula I with the at least one acid, a reaction solution has a pH of from 2 to 9.

9. The process of claim 1,
wherein, after the reacting of the one or more aminosilanes, a reaction solution has a pH of from 3 to 8.

10. The process of claim 9,
wherein, after the reacting of the one or more aminosilanes, a reaction solution has a pH of from 4 to 7.5.

11. The process of claim 2,
wherein the one or more silanes of the formula II comprise substituents of Y selected from the group consisting of OH, OR', OCOR' and Cl.

12. The process of claim 2,
wherein the one or more silanes of the formula II are represented by formula $(R)_a(X)_b Si(OR')_n$, where R, R', X, a and b are defined for the formula II.

13. The process of claim 1,
wherein the one or more aminosilanes of the formula I are reacted in a solution comprising water.

14. The process of claim 1,
wherein a reaction solution comprises at least one of water, acetone, methyl ethyl ketone, propanol, isopropanol, methanol and ethanol, and the reaction solution comprises 0.001 to 100 mol of water per mole of the one or more aminosilanes.

15. The process of claim 1,
further comprising distilling a reaction solution to separate organic solvents from the reaction solution after the one or more aminosilanes of the formula I are reacted.

16. The process of claim 15,
further comprising distilling a reaction solution to separate an alcohol present in the reaction solution.

17. The process of claim 1,
wherein the one or more aminosilanes of the formula I are reacted exclusively in the presence of water and of alcohols formed during hydrolysis.

18. The process of claim 2,
wherein an amount-of-substance ratio of a total of the one or more aminosilanes of the formula I and silanes of the formula II to the water at beginning of the reacting is adjusted to a weight ratio of 1:100 to 100:1.

19. The process of claim 1,
wherein the one or more aminosilanes of the formula I are reacted at a temperature of from 0° C. to 200° C.

20. The process of claim 1,
wherein the one or more aminosilanes of the formula I are reacted at a temperature below a boiling point of a solvent or a solvent mixture.

21. The process of claim 1,
wherein the at least one acid comprising carbon double bonds is crosslinkable after application of the composition to a substrate.

22. A process for forming a film, comprising:
preparing a composition comprising functionalized silanes or functionalized siloxanes, or mixtures thereof by a method comprising reacting one or more aminosilanes with at least one acid comprising carbon double bonds, and water, wherein the one or more aminosilanes are represented by formula I $$A_m SiY_n \qquad (I),$$

in which A is a substituted or unsubstituted aminoalkyl group, a substituted or unsubstituted diaminodialkyl group or a substituted or unsubstituted triaminotrialkyl group, the groups Y are alike or different and Y is OH, ONa, OK, OR', OCOR', OSiR'$_3$, Cl, Br, I or NR'$_2$, m is 1 or 2, and n is 1, 2 or 3, with the proviso that m+n=4, the group R' independently being hydrogen, linear or branched alkyl, cycloalkyl, alkenyl, cycloalkenyl, alkynyl, cycloalkynyl, aryl or heteroaryl groups, each having 1 to 18 C atoms and each being optionally substituted;
applying the composition to a substrate; and
subjecting the composition to irradiation to form a film crosslinked by the irradiation.

23. The process of claim 1,
wherein a product of the reacting of the one or more aminosilanes of the formula I, before or after being worked up, or both, is diluted with a solvent to adjust an acid-neutralized silane content of the product to 0.1% to 50% by weight.

24. A composition obtained by the process in accordance with claim 1.

25. The process of claim 2,
wherein in the formula II, the group X is joined to a silicon atom via at least one carbon atom.

26. The process of claim 23, wherein the solvent is water.

* * * * *